(12) United States Patent
Queisser (10) Patent No.: US 6,419,780 B1
(45) Date of Patent: Jul. 16, 2002

(54) METHOD OF MAKING LAMINATED SHINGLES

(75) Inventor: Michael A. Queisser, Bartlett, IL (US)

(73) Assignee: Reichel & Drews, Inc., Itasca, IL (US)

( * ) Notice: Subject to any disclaimer, the term of this patent is extended or adjusted under 35 U.S.C. 154(b) by 32 days.

(21) Appl. No.: 09/588,409

(22) Filed: Jun. 6, 2000

(51) Int. Cl.[7] .............................................. B32B 31/00
(52) U.S. Cl. ...................... 156/259; 156/263; 156/264; 156/271; 156/279; 52/DIG. 16; 83/920
(58) Field of Search ................................. 156/259, 263, 156/264, 271, 278, 279; 52/DIG. 16; 83/920; 144/13; D25/139

(56) References Cited

U.S. PATENT DOCUMENTS

| | | | |
|---|---|---|---|
| 4,188,763 A | 2/1980 | Thiis-Evensen | 52/557 |
| 4,195,461 A | 4/1980 | Thiis-Evensen | 52/557 |
| 4,317,853 A | 3/1982 | Thiis-Evensen | 428/80 |
| 4,729,814 A | 3/1988 | Jennus et al. | 156/512 |
| 4,775,440 A | 10/1988 | Jennus et al. | 156/260 |
| 4,869,942 A | 9/1989 | Jennus et al. | 428/77 |
| 4,938,657 A | 7/1990 | Benson | 414/790.4 |
| 4,992,312 A | 2/1991 | Frisch | 428/35.7 |
| 5,052,162 A | 10/1991 | Bush et al. | 52/518 |
| 6,190,754 B1 * | 2/2001 | Bondoc et al. | 428/143 |
| 6,235,142 B1 * | 5/2001 | Koschitzky | 156/260 |

* cited by examiner

*Primary Examiner*—Linda Gray
(74) *Attorney, Agent, or Firm*—Wood, Phillips, Katz, Clark & Mortimer (57) ABSTRACT

A method for manufacturing laminated shingles achieves heretofore unobtained versatility by employing separate rolls of substrate materials for underlayment and overlayment webs of the laminated shingles being made. The method contemplates that each of the underlayment and overlayment webs are separately coated with an asphalt composition and granule formulation, whereby the asphalt compositions and/or granule formulations and patterns can be different for each of the webs. Each of the webs is subdivided into plural web portions, which are thereafter laminated, and transversely cut for formation of individual laminated shingles. Laminated shingles formed in accordance with the present method may comprise underlayment and overlayment substrates which differ in thickness, with differing asphalt compositions applied thereto, and/or different granule color formulations and patterns applied to the underlayment and overlayment.

7 Claims, 12 Drawing Sheets

ALTERNATE COATING SECTION

FIG. 7A

ALTERNATE COOLING SECTION

METHOD OF MAKING LAMINATED SHINGLES

TECHNICAL FIELD

The present invention relates generally to a method of making laminated shingles, each comprising plural layers, and more particularly to a method of making these types of shingles, wherein an underlayment and an overlayment of each shingle are formed from different rolls of substrate material. The present method facilitates manufacture of laminated shingles each having an underlayment and overlayment with substrates of potentially differing thicknesses, differing asphalt compositions and/or differing granule formulations adhered thereto.

BACKGROUND OF THE INVENTION

Roofing shingles have found widespread acceptance in the construction industry for covering of roof structures. A typical shingle comprises a web in the form of a fiberglass mat, or like material, which is coated with an asphalt composition to substantially impregnate the substrate. Granules, typically crushed rock with a pigmented ceramic coating, are applied to the top of the substrate, while sand or talc is applied to the back. The granules are pressed into the surface of the asphalt so that they are adhered thereto, with the web of material typically thereafter cooled by application of water sprays. The web of material is thereafter cut to length, and individual shingles stacked and packaged for subsequent storage and shipment.

While shingles formed in accordance with the above process can be provided in varying thicknesses, with varying colors and compositions of granules applied thereto, shingles formed by a lamination process provide a wide variety of aesthetic effects. These types of shingles typically include plural layers comprising an underlayment and overlayment arranged in at least partially overlapping relationship. By profiling an edge of the overlayment to a non-linear configuration, thus exposing portions of the underlayment, different decorative effects can be achieved.

Heretofore, manufacture of laminated shingles has typically been effected by formation from a single web of material. The web is processed in a generally conventional manner, with application of an asphalt composition thereto, and subsequent adherence of granules across the width of the web. Since a single web is employed for manufacture of the laminated shingles, the asphalt composition and the granule formulation adhered thereto are applied essentially uniformly across with width of the web. The single web is thereafter subdivided, typically to provide a pair of underlayments, and a pair (or two pairs) of overlayments for respective lamination to the underlayments.

While laminated shingles can be achieved to create a wide variety of aesthetic effects, including enhanced relief, the above-described process lacks versatility in that the substrate, asphalt composition, and granule formulation for the underlayment and overlayment of each laminated shingle are essentially identical, by virtue of the formation of the shingles from a common web. The present invention contemplates a method of making laminated shingles which greatly enhances the versatility with which such shingles can be manufactured.

SUMMARY OF THE INVENTION

A method of continuously making laminated shingles in accordance with the present invention contemplates that an underlayment and an overlayment of each laminated shingle are formed from different rolls of substrate material, and can be processed by different techniques, including application of differing asphalt compositions and/or differing granule formulations. Not only can the thickness of the underlayment and overlayment of each shingle be selected to be different, a wide variety of aesthetic effects can be achieved by varying the color formulation of the granules applied to each of the underlayment and overlayment. Differing asphalt compositions can be applied to each of the underlayment and overlayment of each shingle further enhancing the versatility of the present method.

In accordance with the disclosed embodiment, the present method of making laminated shingles comprises the steps of providing a first roll of substrate material to provide an underlayment web to form an underlayment for each of the laminated shingles. The method further comprises providing a second roll of substrate material to provide an overlayment web to form an overlayment for each of the laminated shingles. As noted, each of the substrates of material, typically comprising fiberglass mat or other material, can be selected as may be desired for the specific laminated shingle being made, including selection of substrate materials having differing thicknesses.

The present method further contemplates subdividing the underlayment web along the length thereof into plural subdivided underlayment web portions. Similarly, the overlayment web is subdivided along the length thereof into plural subdivided overlayment web portions. Lamination of respective ones of the underlayment web portions and overlayment web portions is effected to form plural laminated webs, with individual shingles formed by transversely cutting each of the laminated webs into individual laminated shingles.

In accordance with typical shingle-forming techniques, an asphalt coating composition is applied to each of the underlayment and overlayment substrates prior to the subdivision thereof, with the present method further comprising application of a granule formulation onto the asphalt coating on each of the underlayment and overlayment webs. By virtue of the formation of the underlayment and overlayment of each laminated shingle from different rolls of substrate material, the present method facilitates application of differing amounts of the asphalt coating composition, per unit of surface area, to each of the underlayment and overlayment webs. If desired, different asphalt compositions may be applied to each of the underlayment and overlayment webs. Similarly, the granule formulation applied to the underlayment web can differ from the granular formulation applied to the overlayment web, thus permitting the colors of the formulations to be different, or the formulations to be otherwise varied for desired aesthetic or functional effects. As noted, the substrate which forms the underlayment and overlayment webs can be of differing thicknesses for each of the webs, thus providing further versatility in the manufacture of the laminated shingles.

As will be appreciated, laminated shingles formed in accordance with the present invention include plural layers comprising an underlayment and an overlayment arranged in at least partially overlapping relationship, and include an adhesive for bonding the underlayment and overlayment to each other. Each of the underlayment and overlayment comprises a substrate, an asphalt coating composition on the substrate, and a granule formulation adhered thereto. In accordance with the present invention, the substrate of the underlayment can differ in thickness from the substrate of the overlayment, with the granule formulation adhered to the underlayment differing, such as in color, from the granule formulation adhered to the overlayment. If desired, the amount of asphalt coating applied to each of the underlayment and overlayment may differ and/or the asphalt composition applied to the underlayment may differ from that applied to the overlayment.

Other features and advantages of the present invention will become readily apparent from the following detailed description, the accompanying drawings, and the appended claims.

DETAILED DESCRIPTION

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

Figure 1A:
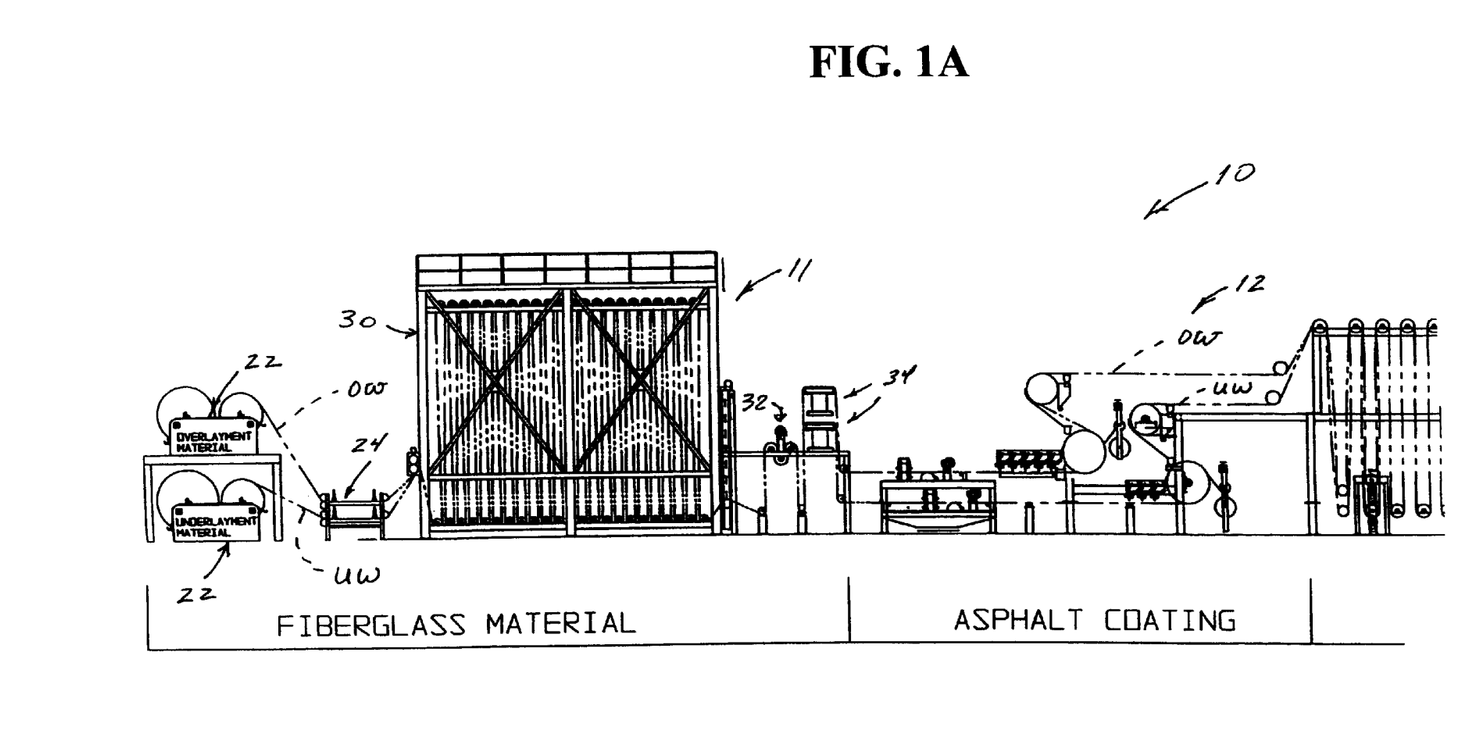
FIGS. 1A to 1C are diagrammatic views of an apparatus for making laminated shingles in accordance with the present invention.
Figure 1B:
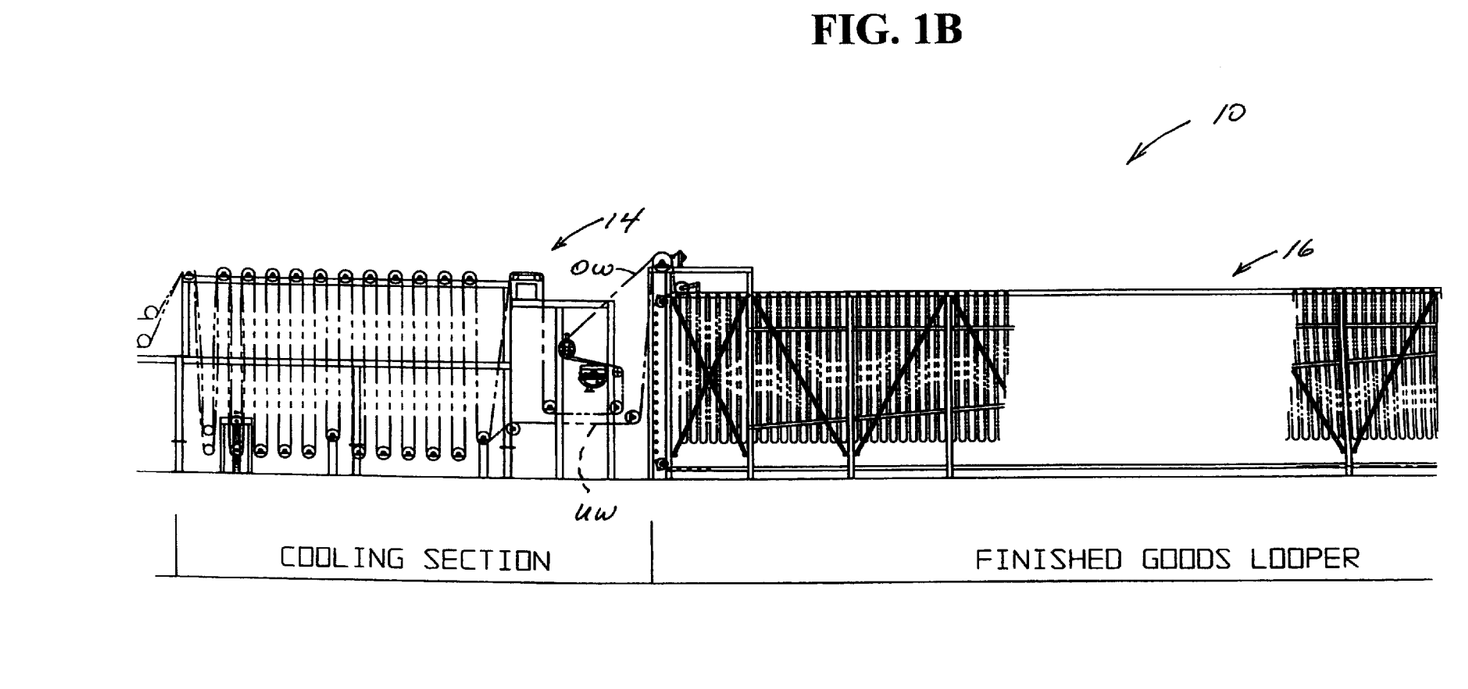
Figure 1C:
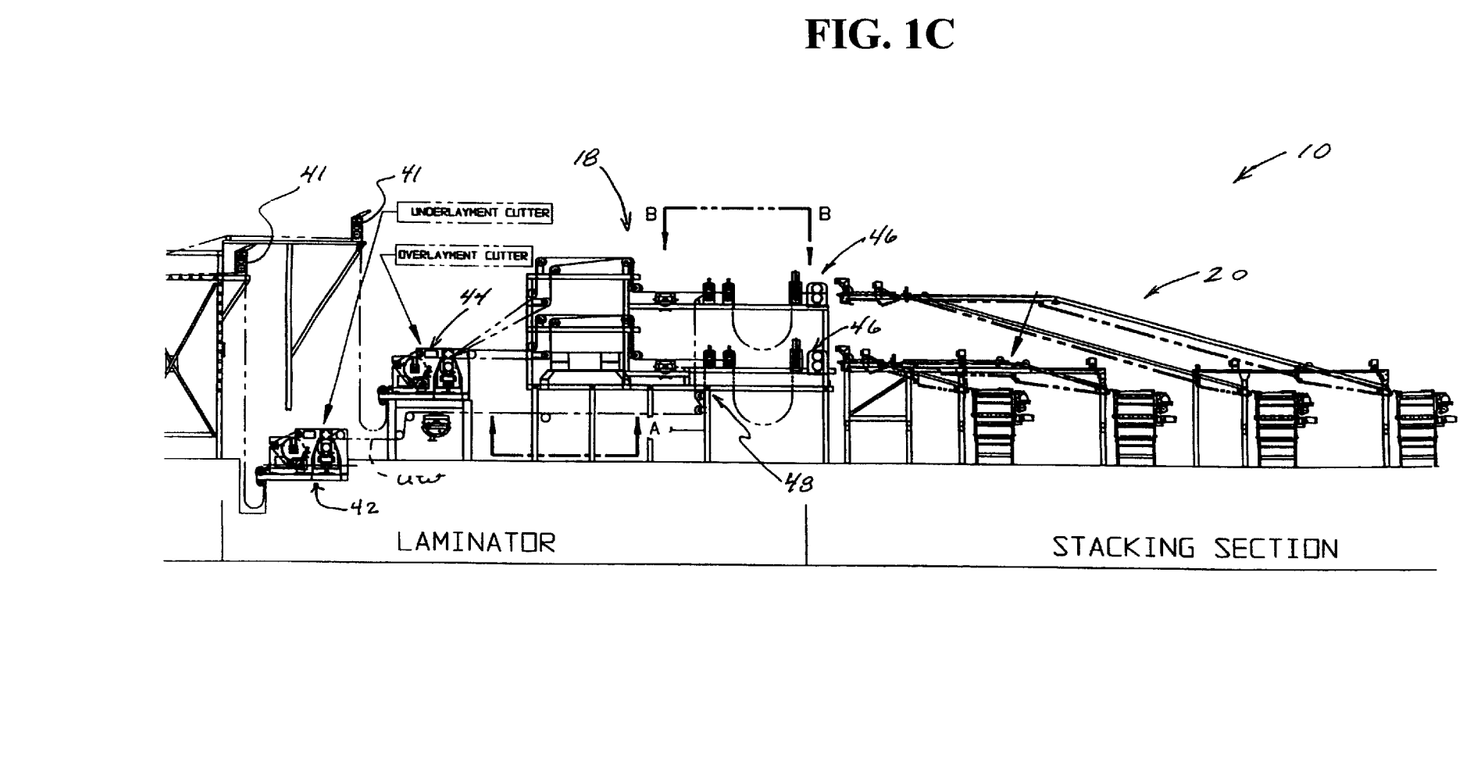
Figure 1D:
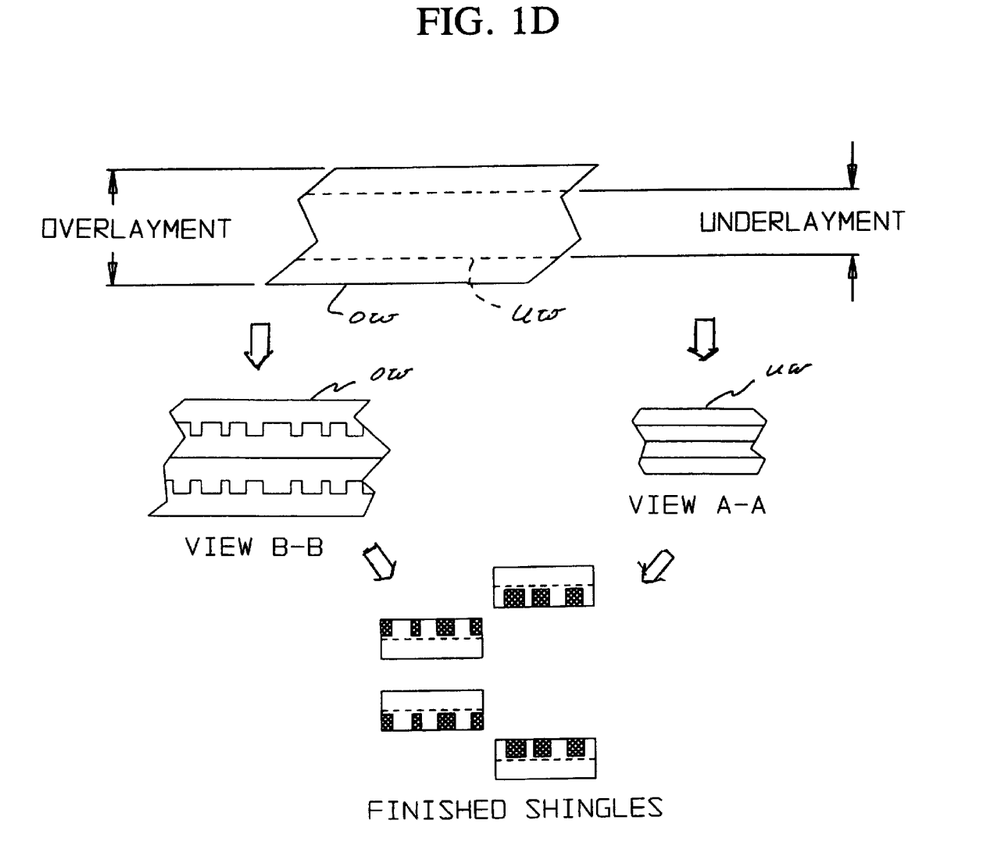
FIG. 1D is a diagrammatic view of the manner in which underlayment and overlayment webs are subdivided and laminated for shingle formation.

With reference first to FIGS. 1A to 1C, therein is illustrated a shingle making apparatus 10, for making laminated shingles, embodying the principles of the present invention. As will be described, a number of the components of the apparatus 10 are of a generally conventional configuration, and are of the type employed during manufacture of typical asphalt-coated roofing shingles. Thus, the present method can be economically practiced, while still providing heretofore unachieved versatility in manufacture of laminated shingle articles. As will be further described, the apparatus includes a number of generally distinct process sections arranged in a sequence by which starting materials are combined and processed into stacks of finished, laminated shingles. The general order and nature of these various sections will first be described, with further details of the various sections set forth hereinafter.

A first section 11 of the illustrated apparatus is configured for handling of the substrate material of each of the shingles being manufactured, typically comprising substantially continuous fiberglass mat or other material, as is known in the art. Significantly, in a departure from previous techniques for manufacture of laminated shingles, the fiberglass material handling section 11 of the illustrated apparatus facilitates unwinding and splicing of rolls of material to provide separate underlayment and overlayment webs UW and OW, respectively, for manufacture of laminated shingles.

An asphalt/granule coating section 12 is the next portion of the illustrated apparatus, with this section configured to effect coating of an asphalt composition on each of the underlayment and overlayment webs, followed by dispensing of granular material onto the hot asphalt coating so that the granules are adhered to the respective webs. By virtue of the provision of separate underlayment and overlayment webs, the amount and composition of each asphalt coating applied to each of the webs can differ, as may be desired, as can the formulation of granules applied to each of the webs (e.g., granule formulations may differ in color).

After coating, the underlayment and overlayment webs are directed through a cooling section 14 by which the hot asphalt is cooled and stabilized, together with the granule coating thereon.

A finished goods looper 16 follows the cooling section 14, at which the underlayment and overlayment webs, now each coated with an asphalt composition and granule formulation, are accumulated for subsequent cutting and lamination.

At laminator 18, cutting and lamination of the underlayment and overlayment webs is effected. Individual shingles are cut to length from the laminated webs.

Finally, at stacking station 20, the finished laminated shingles are stacked for packaging, shipment, and storage.

Figure 2A:
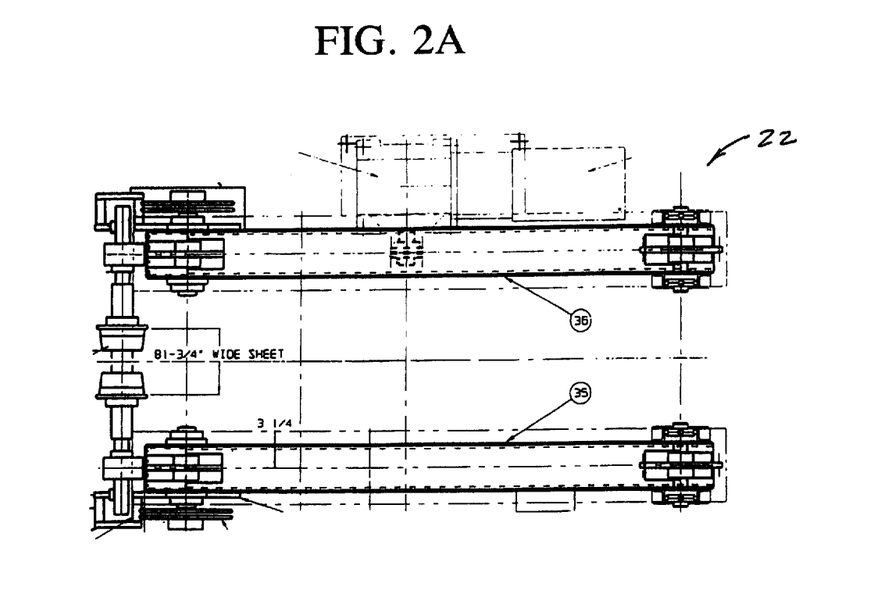
FIGS. 2A and 2B are diagrammatic, top plan and elevation views, respectively, of an unwinder stand assembly that can be used for practice of the present method.
Figure 2B:
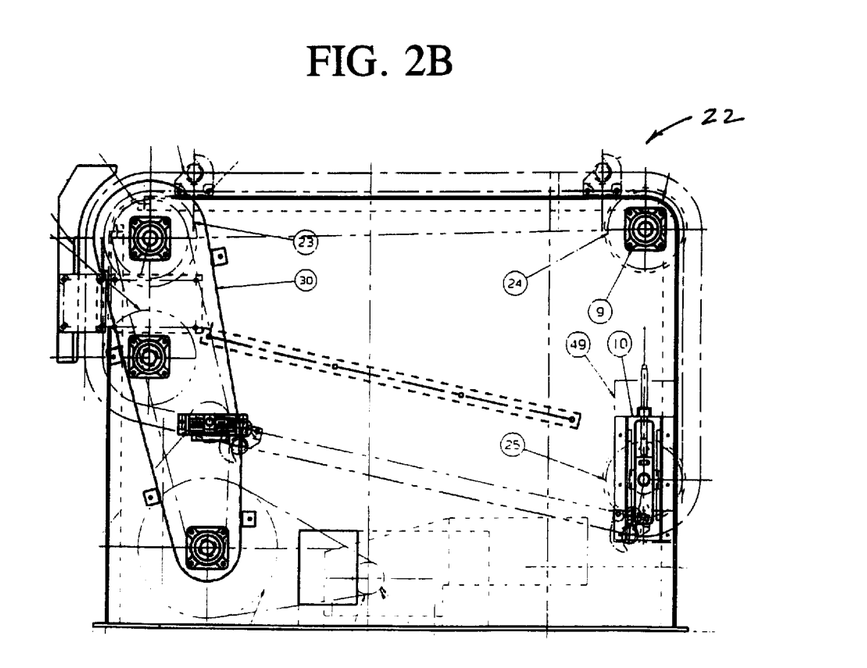
Figure 3:
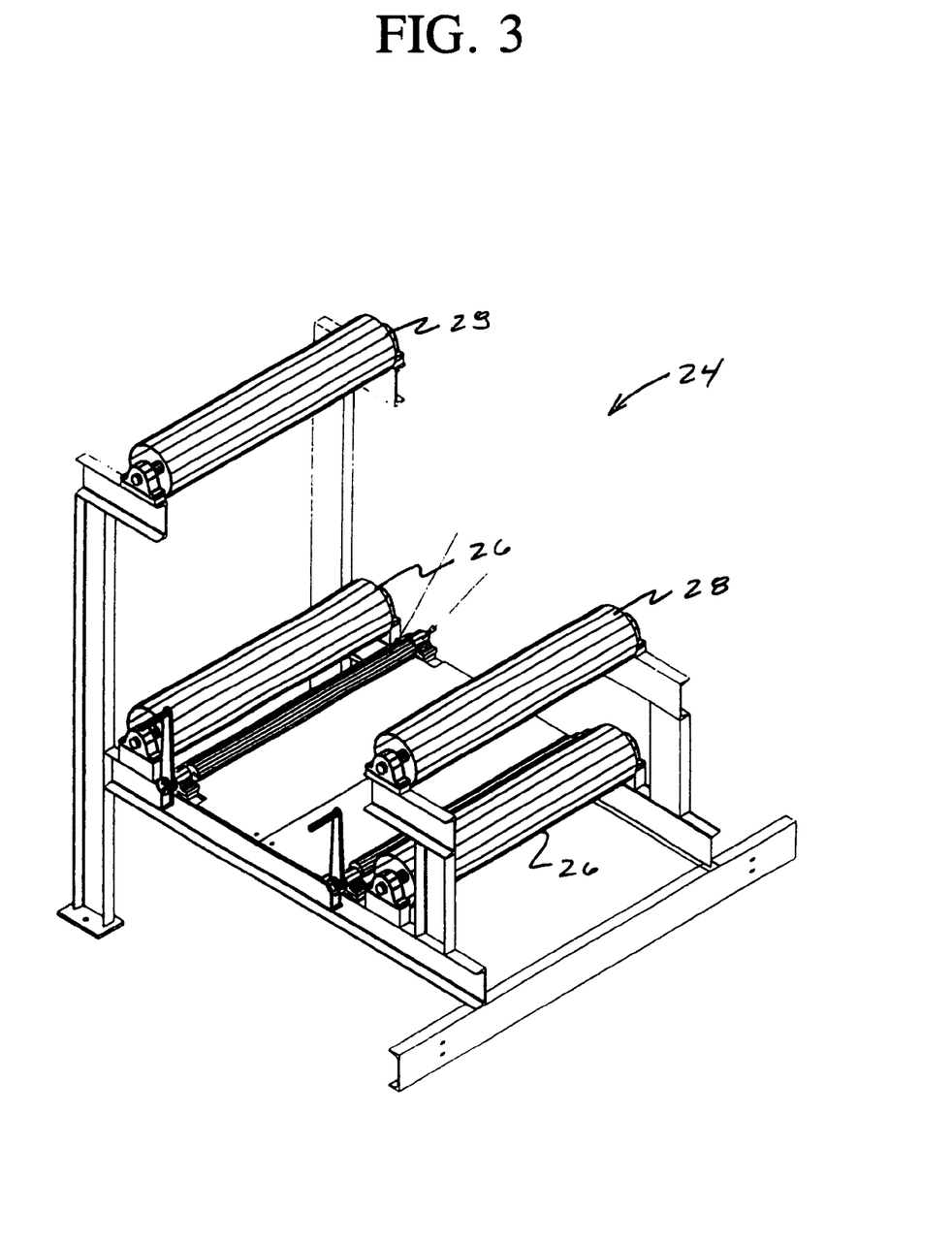
FIG. 3 is a diagrammatic, perspective view of a splice table assembly which can be used for practice of the present method.

With further reference now to unwinding section 11, FIGS. 2A and 2B diagrammatically illustrate a typical unwinder apparatus 22. As illustrated in FIG. 1A, practice of the present method contemplates use of two unwinders 22, one for providing an underlayment web from a first roll of substrate material, with the other providing an overlayment web from a second roll of substrate material. Thus, the underlayment and overlayment webs may be formed from different base or substrate materials, such as materials that differ in weight or composition. In accordance with the preferred form, each of the unwinder apparatus 22 is configured for holding two bulk rolls of raw substrate material. By this arrangement, one roll of material is being processed, while the other roll is in position to be moved forward and the leading edge thereof spliced into the tail end of the previous roll. FIG. 3 illustrates a typical splicing table 24, having lower rollers 26 and upper rollers 28 (with independent splicing tables provides for the webs), to facilitate splicing of both the underlayment substrate and overlayment substrate.

Material handling section 10 next includes a splice accumulator 30 which receives the underlayment and overlayment substrates from the splicing table 24. Splice accumulator 30 is of a generally conventional configuration, with a series of rollers provided so that a multiplicity of loops of substrate material can be accumulated within the structure.

The accumulator acts to accumulate a predetermined amount of substrate material, so that when a splice is made in either of the underlayment or overlayment substrates, the manufacturing line does not need to be shut down. In this regard, it is contemplated that when a splice is made to either of the substrates, both of the substrates are stopped at the entrance to splice accumulator, to ensure that splicing of one substrate occurs at an appropriate time so that the other roll of material does not run out before the first splice is completed.

Figure 4:
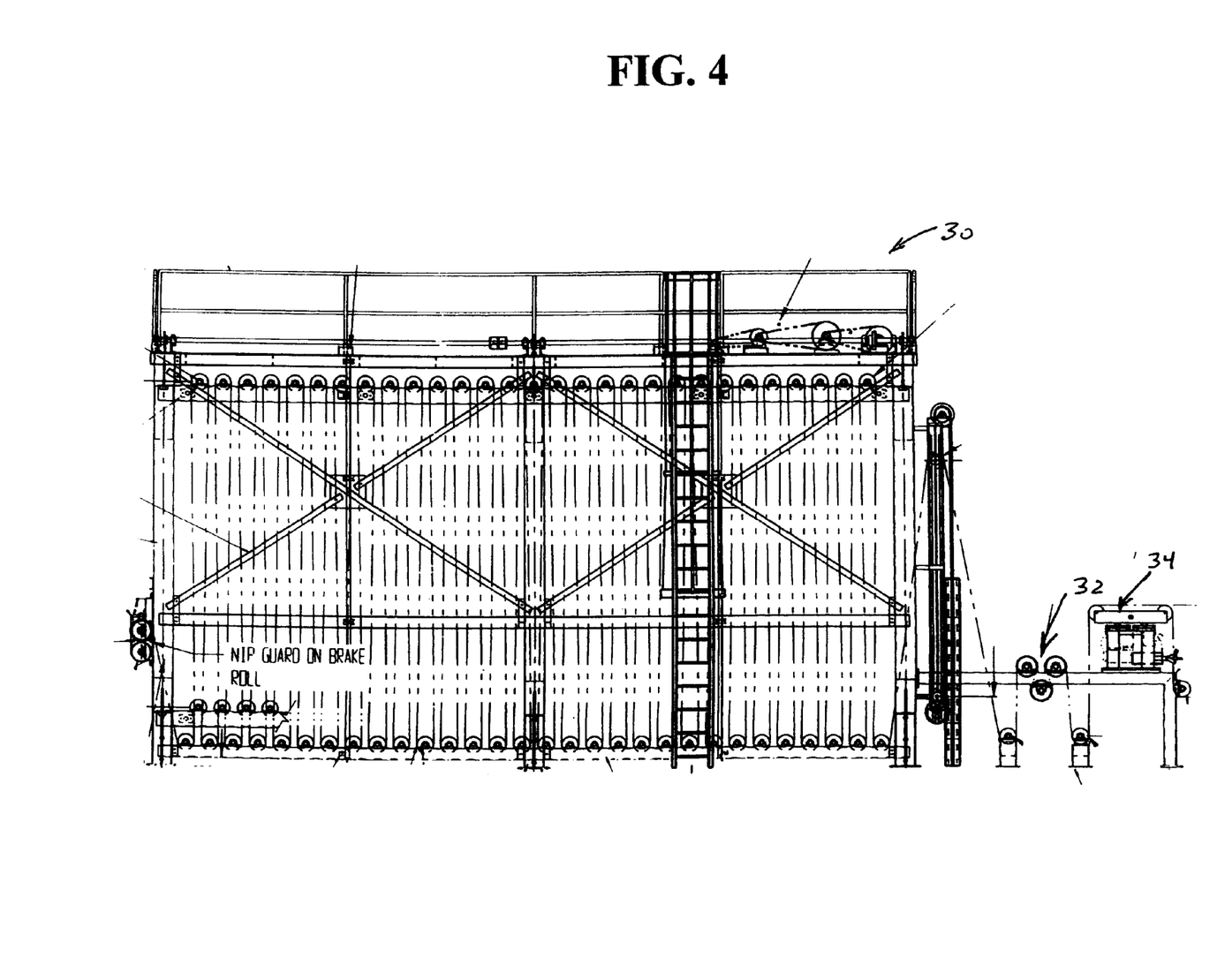
FIG. 4 is a diagrammatic, side elevational view of a dry mat looper which functions as a splice accumulator for practice of the present method.

FIG. 4 illustrates splice accumulator 30, with the underlayment and overlayment substrates moved through the accumulator in overlying relationship. A triple pull roll set 32 is employed to pull both substrates simultaneously through the splice accumulator. Thereafter, a pair of guides 34 (one illustrated in FIG. 4) are provided so that the underlayment and overlayment substrates may be separated, and independently guided for subsequent coating.

Figure 5:
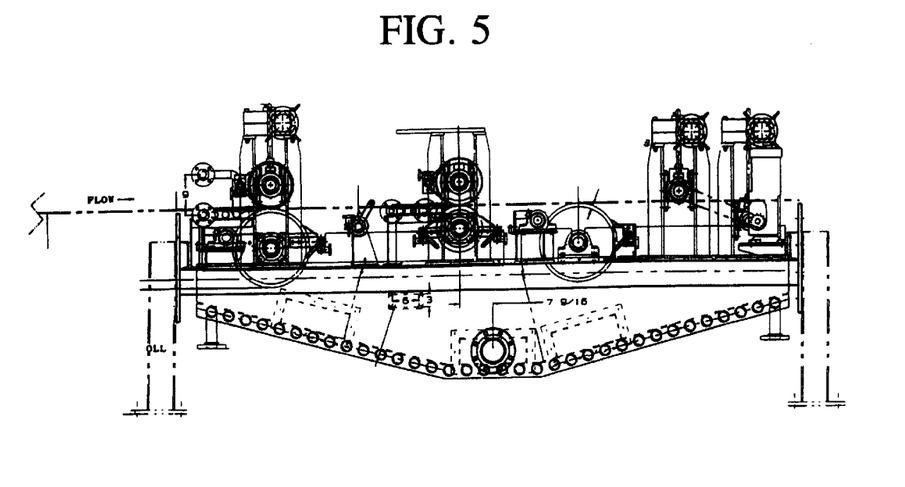
FIGS. 5 and 5A are diagrammatic, side elevational views of asphalt composition coaters which can be used for practice of the present invention.
Figure 5A:
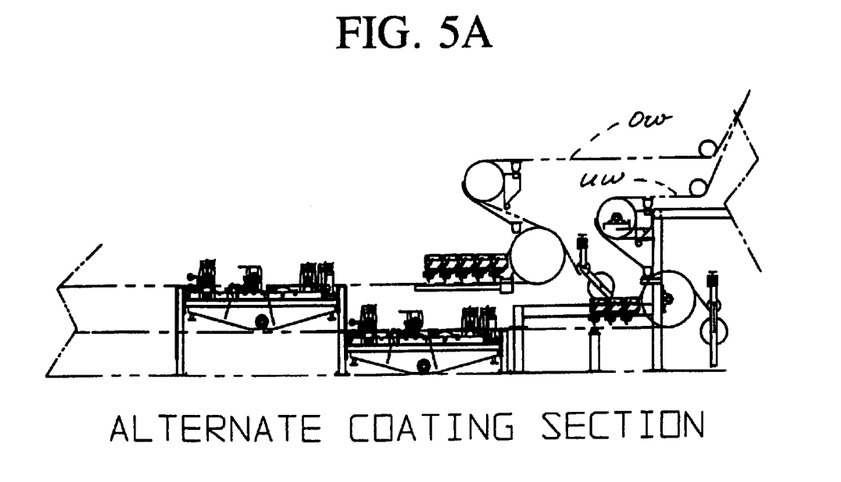

At asphalt/granule coating section 12, an asphalt composition is applied to the top and bottom of each of the underlayment and overlayment webs, and granular material applied to the hot asphalt and adhered thereto. It is contemplated that this section of the apparatus may be configured in one of two different arrangements, depending upon specific manufacturing criteria. In the arrangement illustrated in FIG. 1A, a skeletal asphalt coater is located above a full asphalt coater, of the type generally illustrated in FIG. 5. This arrangement can be employed when the same asphalt composition is to be applied to both the underlayment and overlayment webs. It is contemplated that the upper (overlayment) web be wider than the bottom (underlayment) web, and the arrangement of a skeletal coater above the full coater allows for asphalt coating overflow from the upper web to drain into the recirculation system of the lower coater. A single recirculation pump and supply pump can thus be employed for both the skeletal and full coater, rather than individual pumps for each coater. An alternative arrangement is illustrated in FIG. 5A. In this configuration, two full asphalt coaters (each generally configured in accordance with the coater illustrated in FIG. 5) are employed. By this arrangement, different asphalt compositions can be applied to each of the underlayment and overlayment webs. This permits maximum differentiation of the finished product. Additionally, different application temperatures for the asphalt compositions can be achieved. In either arrangement, the thickness of the asphalt coating may differ for each of the webs.

Figure 6:
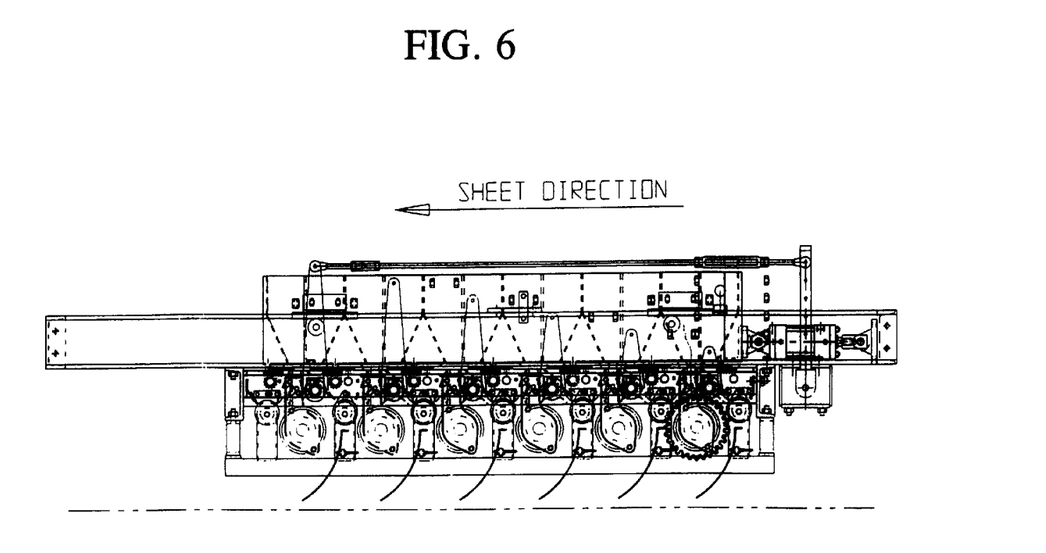
FIG. 6 is a diagrammatic, side elevational view of an apparatus for applying a granule formulation to an asphalt-coated substrate for practicing the present invention.

Irrespective of the asphalt coating arrangement, the present invention contemplates that separate granule application devices, such as illustrated in FIG. 6 and as are known in the art, will be employed for each of the underlayment and overlayment webs. After the asphalt composition has been applied to the top and bottom surfaces of each of the webs, the appropriate granule formulation is applied to each of the webs, with color, pattern, etc., differing between the underlayment and overlayment webs as may be desired. In conjunction with granule application, required back coating (typically sand or talc) is applied to each of the underlayment and overlayment webs. If desired, the webs can be differently back-coated. Additionally, a release film can be applied to the UW if required.

Figure 7:
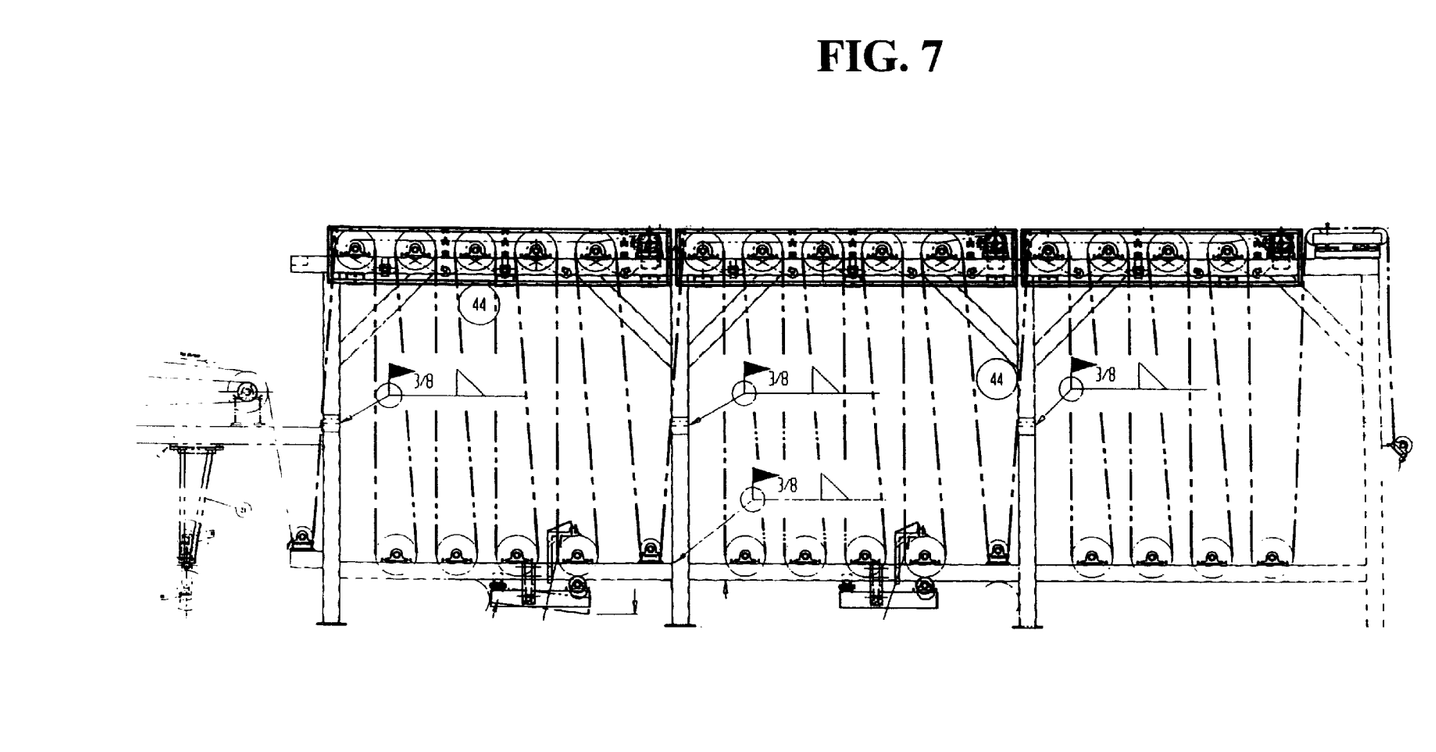
FIGS. 7 and 7A are diagrammatic, side elevational views of web-cooling assemblies for cooling the webs, and asphalt and granules applied thereto.

At cooling section 14, illustrated in FIG. 7, the webs are subjected to water spray for cooling and stabilizing the hot asphalt coating composition. As both webs enter the cooling section, they are separated by ceramic covered rods or other devices. Each web is provided with its own press roll set and water spray bar, as are known in the art. The cooling section shows that both the upper and lower webs utilize the same upper and lower rolls. The two webs are preferably separated by rollers or stationary ceramic or chrome plated bars (i.e., spreaders) before and after each large roll to facilitate application of water to the interior surfaces of the webs for cooling purposes.

Figure 7A:
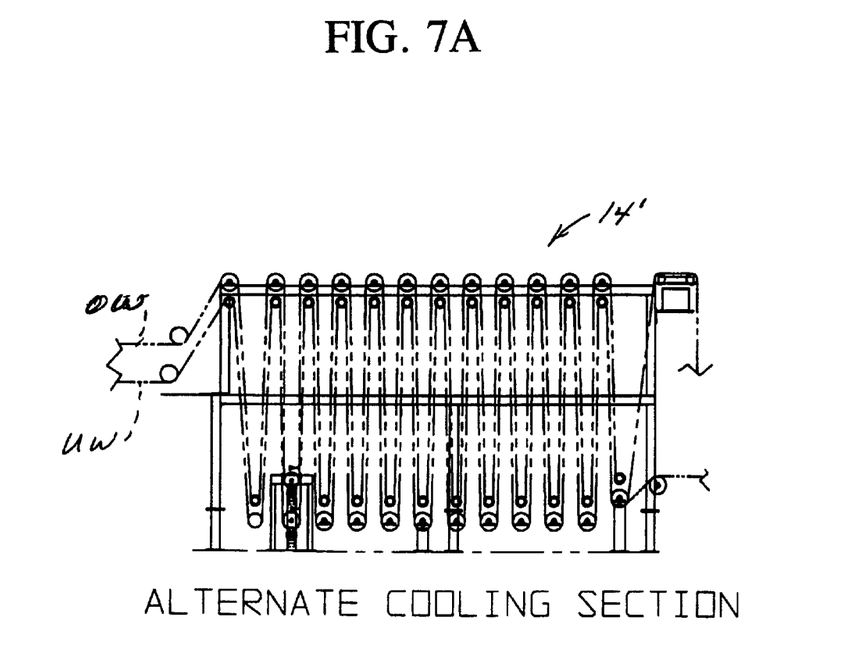

FIG. 7A illustrates an alternative cooling section 14', employing twice the number of cooling rolls. In this alternative configuration, each of the upper and lower webs is provided with its own set of rolls in the cooling section. In this arrangement, the smaller, lower rolls for each web path can be moved vertically to allow for a "straight through" threading of the webs through the cooling section. This substantially reduces the labor required during the socalled "thread up" operation. Additionally, this alternative configuration facilitates elimination of any differential speed between the underlayment and overlayment webs.

As shown in FIG. 1A, a self-seal applicator 40 is provided at the end of the cooling section so that the upper web of material can receive an application of seal-down material. This material, as is known in the art, is used to prevent wind uplift of shingles on the roof of a house. The applicator preferably includes a web guiding system for accurate application of the seal-down material.

The webs are next directed through the finished goods looper 16 after the webs have cooled. FIG. 7 generally illustrates the configuration of a finished goods looper for handling a single web of material. The webs are moved through the looper in overlying relationship together, with the underlayment and overlayment webs removed from the looper by respective sets of pull rolls 41 (FIG. 1C).

Figure 8:
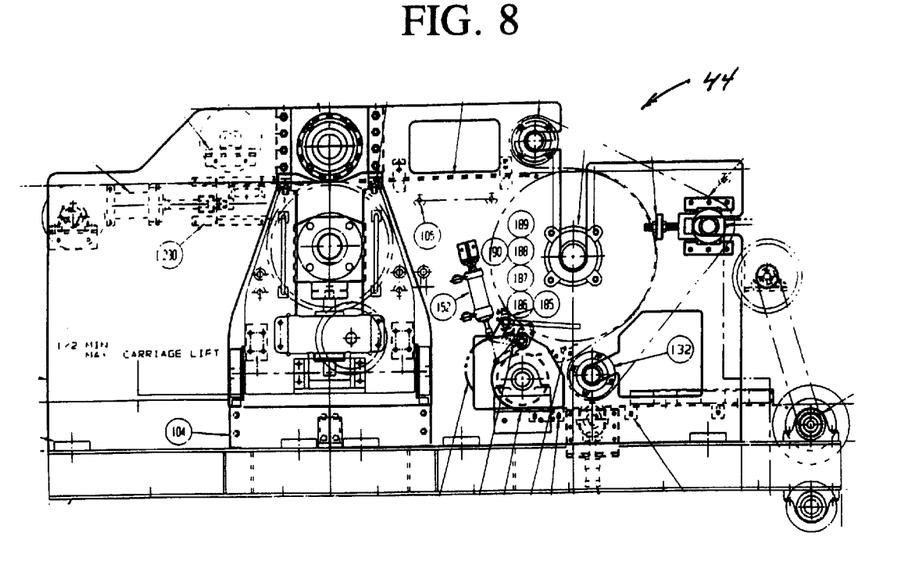
FIG. 8 is a diagrammatic, side elevational view of a cutter assembly for effecting subdivision of the webs in accordance with the present invention.

From the finished goods looper 16, the underlayment and overlayment webs, now coated and cooled, are directed to the laminator section 18. The underlayment web and the overlayment web are first respectively directed through UW cutter 42 and OW pattern cutter 44, with FIG. 8 generally illustrating pattern cutter 44. The entry into each cutter is by means of a free loop of material. The cutter speed is the master speed, and the pull roll ahead of the cutter is adjusted in speed to regulate the loop. In the illustrated arrangement, the UW cutter subdivides the lower, underlayment web into four separate web portions while the upper, overlayment web is cut by the pattern cutter into four subdivided web portions, each having a non-linear (profiled) edge as shown. The use of separate cutters permits patterning possibilities not previously available on existing lines for manufacture of laminated shingles, which typically use a single pattern cutter for all components. It is also contemplated that the underlayments can be cut with various patterns, which heretofore has been difficult to accomplish in light of formation of laminated shingles from a single, common web.

Figure 9:
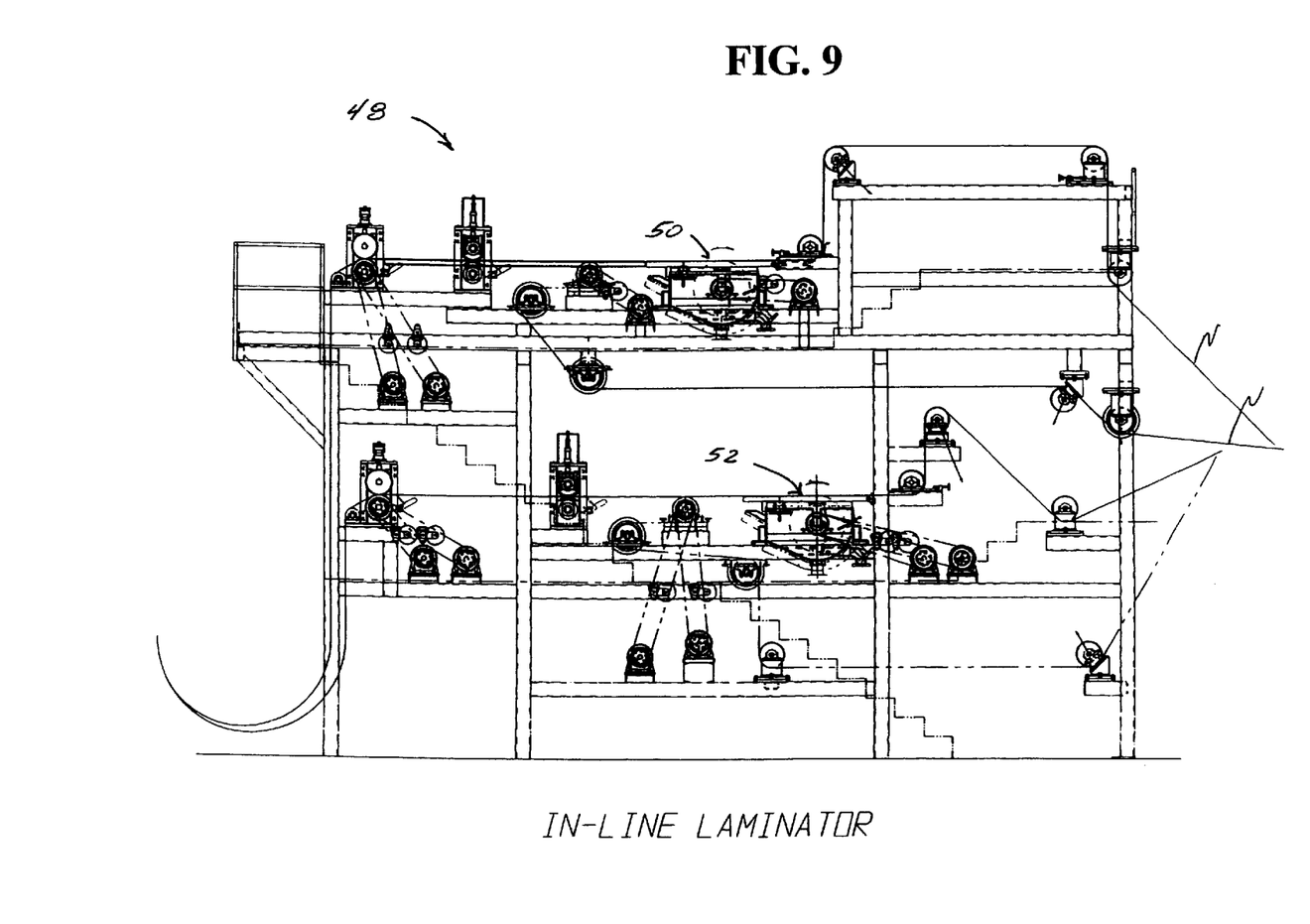
FIG. 9 is a diagrammatic, side elevational view of an in-line laminator for practice of the present invention.

The laminator apparatus 48 is generally illustrated in FIG. 9. By this arrangement, adhesive is applied to the bottom surface of the overlayment web portions by upper and lower adhesive coating devices 50, 52. When each of the underlayment and overlayment webs is subdivided into four web portions, as described above, two laminated webs are formed by the upper adhesive device, and two laminated webs are formed by the lower adhesive device of the laminator. The subdivided web portions are processed through the laminator under controlled tension. This will provide the capability of matching "nonrandom" patterns cut into the lower and upper webs, and maintaining the matching of patterns precisely throughout the laminator. This permits the present manufacturing process to create an almost infinite range of new shingle designs and patterns. Driven rolls at the end of the laminator at each web portion pull the web, and are speed controlled using load cells to monitor web tension.

Figure 10:
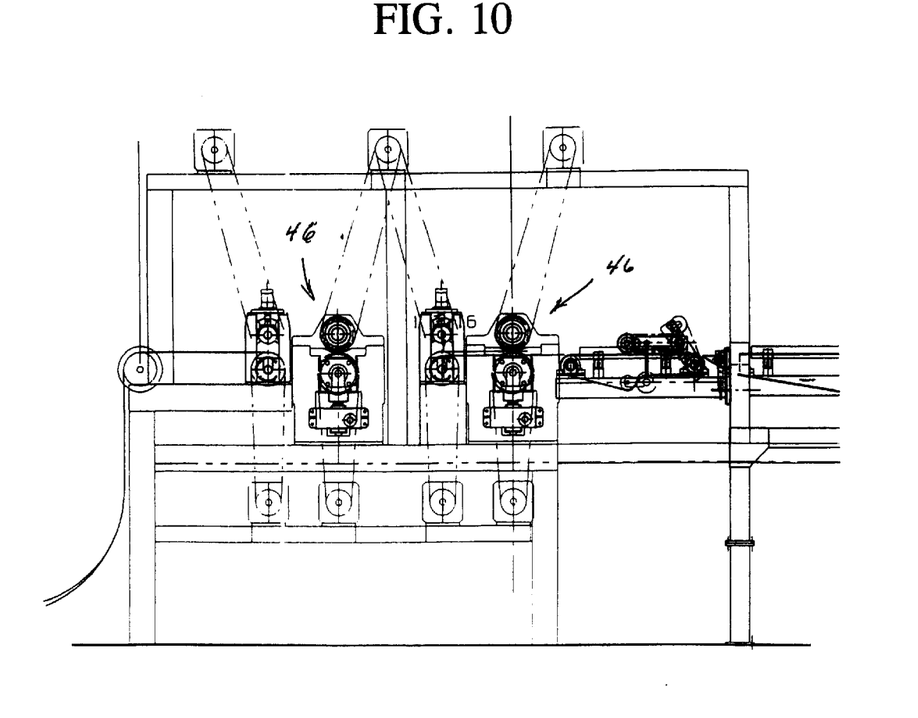
FIG. 10 is a diagrammatic, side elevational view of a cut-to-length module for transversely cutting laminated webs formed in accordance with the present invention into individual shingles.

FIG. 10 illustrates cut-to-length cutter modules 46 which effect transverse cutting of the laminated webs for formation of individual shingles. A free loop of material is formed after the exit pull roll on each lane of the laminator. Each laminated web of material enters the cut-to-length cutter with minimum tension. This permits the transverse cut to be made in a precise relationship to any part of the pattern created in the pattern cutter. Individual shingles are directed to the stacking section 20, where a plurality of shingle stackers, as are known in the art, are employed for forming the shingles into stacks, for subsequent packaging, storage, and shipment.

It is presently contemplated that alternating current servo-drives are preferably employed in the upper and lower web drives within the laminator section 18 of the present apparatus. By this arrangement, accurate pattern cutting and synchronization can be achieved, with the arrangement further facilitating accuracy during speed-up and slow-down of the manufacturing line. In contrast, typical laminating devices have manufactured "off-length" shingle products during speed changing. Notably, the reduction in this type of scrap offsets the additional cost for such servo-drives which are typically more expensive than flux vector or digital direct current drives.

A particular benefit of the present system is its adaptability for retrofit to existing shingle manufacturing lines by the addition of appropriate equipment. If desired, an existing line could still be used for making conventional shingles. Desirably, a retrofitted line is no wider than an existing line, although some lengthening may be required in view of the addition of the laminating section. Nevertheless, the majority of existing equipment can be utilized. Granule and asphalt coating supplies would have to be enhanced because of the increase in total material processed by the line.

By way of an example, an existing 48 inch wide shingle manufacturing line could be readily converted to make four lanes of laminated shingles. In such an arrangement, an upper (overlayment) web 42 inches wide could be employed, with a lower (underlayment) web 24 inches wide used. Again, each of these webs would be subdivided into four respective web portions for eventual lamination. By the previous method of producing laminated shingles, a web 66-inches wide (i.e., 42 inches plus 24 inches) would have to be used. Thus, to make four lanes of laminated shingles, a new wide line would be required. If an existing line were to be employed, the typical 36 inch or 48 inch wide webs handled by such lines would limit conventional manufacture to only two lanes of laminated shingles. This would undesirably detract from economical manufacture. Thus, it will be appreciated that by the present method, economical manufacture of laminated shingles is promoted, apart from the greatly enhanced versatility with which such shingles can be manufactured.

From the foregoing, numerous modifications and variations can be effected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A method of making laminated shingles, comprising the steps of:
   providing a first roll of substrate material to provide an underlayment web to form an underlayment for each of said laminated shingles;
   providing a second roll of substrate material to provide an overlayment web to form an overlayment for each of said laminated shingles;
   subdividing said underlayment web along the length thereof into plural subdivided underlayment web portions;
   subdividing said overlayment web along the length thereof into plural subdivided overlayment web portions;
   laminating respective ones of said underlayment web portions and said overlayment web portions to form plural laminated webs; and
   transversely cutting each of said laminated webs into individual laminated shingles.

2. A method of making laminated shingles in accordance with claim 1, including:
   providing the material of said first roll in a thickness and/or composition that differs from the thickness and/or composition of the material of the second roll.

3. A method of making laminated shingles in accordance with claim 1, including:
   applying an asphalt coating to each of said underlayment and overlayment webs prior to said subdividing steps, and
   subsequently applying a granule formation onto the asphalt coating on each of said underlayment and overlayment webs.

4. A method of making a laminated shingle in accordance with claim 3, wherein:
   said asphalt applying step includes applying an amount of asphalt coating on said underlayment web that differs from the amount of asphalt coating applied to said overlayment web.

5. A method of making a laminated shingle in accordance with claim 3, wherein:
   said asphalt applying step includes applying an asphalt composition onto said underlayment web which differs from an asphalt composition applied onto said overlayment web.

6. A method of making a laminated shingle in accordance with claim 3, wherein:
   said granule formation applying step includes applying a granule formation on said underlayment web that differs from a granule formation applied to said overlayment web.

7. A method of making a laminated shingle in accordance with claim 1, wherein:
   said step of subdividing said overlayment web includes cutting said overlayment web to form each of said plural subdivided overlayment webs with a non-linear profile.

* * * * *